May 7, 1968 N. M. HATCHER 3,381,569
ATTITUDE SENSOR FOR SPACE VEHICLES
Filed May 21, 1964 3 Sheets-Sheet 1

INVENTOR
NORMAN M. HATCHER

BY
*9 Hm̄ Coy*
*William H. King*
ATTORNEYS

United States Patent Office 3,381,569
Patented May 7, 1968

3,381,569
ATTITUDE SENSOR FOR SPACE VEHICLES
Norman M. Hatcher, Hampton, Va., assignor to the United States of America as represented by the Administrator of the National Aeronautics and Space Administration
Filed May 21, 1964, Ser. No. 369,334
4 Claims. (Cl. 88—1)

ABSTRACT OF THE DISCLOSURE

The attitude sensor has mirrors which rotate through a scanning angle of at least 30 degrees. The radiation from the object being scanned is focused onto detectors. When the radiation fields of view cross, discontinuity exists at the edge of the object resulting in a change in the output of the radiation detectors. The output is fed into circuitry providing a pulse that is representative of the angular deviation of the sensor axis from the center of the object. This pulse can be applied to a torquing or other system which realigns the vehicle associated with the sensor.

---

The invention described herein may be manufactured and used by or for the Government of the United States of America for governmental purposes without the payment of any royalties thereon or therefor.

This invention relates generally to an attitude sensor and more particularly concerns an attitude sensor which detects and indicates, by means of electrical output signals, the orientation of a space vehicle relative to a planetary body.

When a space vehicle is in the vicinity of a planet, such as earth, it is usually desirable that the space vehicle maintain a certain predetermined attitude with respect to the planet. For example, when a space vehicle is orbiting a planet it is desirable that the space vehicle maintain an attitude such that its vertical axis is pointing in the direction of the center of the planet. To maintain such an attitude it is necessary to have two sensors on the space vehicle to produce signals which represent any misalignment, in two mutually perpendicular planes, of the space vehicle's vertical axis with the center of the planet. These signals can then be applied to a torquing system on the space vehicle to correct the attitude of the space vehicle.

Although several attitude sensors have been developed in the past, they have a number of disadvantages. Among these disadvantages are: they are relatively heavy; they are large thereby occupying a large amount of needed space on the vehicle; they consume large amounts of electrical power; they have severely limited lifetimes; and they have operations which are impaired by large variations in emitted radiation over the surface of the planetary body.

It is therefore an object of this invention to provide an attitude sensor which reduces the disadvantages of attitude sensors developed in the past.

Another object of this invention is to provide a novel space vehicle attitude sensor.

Still another object of this invention is to provide an attitude sensor which produces signals representing attitude in two mutually perpendicular planes.

A further object of this invention is to provide a compact, durable, attitude sensor for use on medium to high space vehicles.

A still further object of this invention is to provide a new and improved lightweight, compact, durable horizon scanning apparatus.

Another still further object of this invention is to provide a novel altitude measuring device.

In order to accomplish these and other objectives the present invention utilizes the fact that a planet emits much larger amounts of radiation than does the space that surrounds it. The difference in radiation is used to sense the attitude of the space vehicle. The attitude sensor which constitutes the present invention consists essentially of a lens that serves to focus the incoming radiation from space and planet upon infrared radiation detectors such as thermistors. Mirrors located between the lens and the radiation detectors serve to oscillate the fields of view of the detectors so that the detectors alternately view space and planet. Two mirrors, for scanning in each of two mutually perpendicular planes, are oscillated in such a manner that opposite fields of view always make equal angles with the axis of the sensor. Thus, if the sensor axis is not aligned with the center of the planet, one field of view will cross one edge of the planet before the opposite field of view crosses the opposite edge of the planet. When the fields of view cross the radiation discontinuity existing at the edge of the planet, a large change occurs in the output of the radiation detectors. The change will be positive when scanning from space across planet and negative during the second half of the scan cycle when the fields of view scan from planet to space. By means of diodes placed in the circuitry, only the positive signal is used. The time difference between intersecting opposite edges of the planet is thus proportional to angular deviation of the sensor axis from the center of the planet. To produce a useable attitude signal, the electrical outputs from the detectors are amplified as pulses by AC amplifiers and used to trigger bistable multivibrators, or some other bistable electrical or mechanical device which acts as a switch that is caused to conduct by the pulse outputs from the detectors. Both multivibrators in one plane are caused to cease conducting simultaneously by a pulse applied to the bases of the multivibrator transistors. This pulse is produced electromagnetically by the interaction of a small piece of ferrous material, mounted on one mirror in each scanning plane, with the magnetic field of a pickup coil. The outputs of the two multivibrators are then applied to an adder circuit. The output of the adder is a pulse of constant amplitude and of a duration which is proportional to the angular deviation of the sensor axis from the center of the planet. This pulse output can be used directly by the vehicular torquing or control system, or it can be altered by one of several means to produce a signal that can be readily used by the torquing system to maintain proper vehicular alignment with respect to the planet.

A more complete appreciation of the invention and many of the attendant advantages thereof will be readily appreciated as the same becomes better understood by reference to the following detailed description when considered in connection with the accompanying drawings in which.

Figure 1:
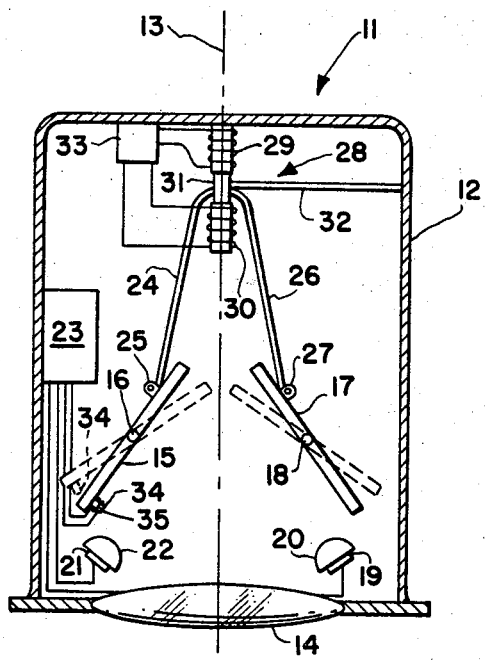
FIG. 1 is a cross-sectional view of the horizon scanning apparatus used in the present invention.

In describing the preferred embodiment of the invention illustrated in the drawings, specific terminology will be resorted to for the sake of clarity; however, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings the number 11 in FIG. 1 designates generally the attitude sensor which constitutes this invention. The attitude sensor is housed in a closed cylinder 12 having a vertical axis 13. Located in one end of cylinder 12 and perpendicular to axis 13 is a lens 14. A mirror 15 is mounted on a rotatable shaft 16 and a mirror 17 is mounted on a rotatable shaft 18. Shafts 16 and 18 are parallel to each other, they are equidistance from vertical axis 13 and they are equidistance from the center of lens 14. An infrared radiation detector 19 with a hemispherical lens 20 are associated with mirror 15 and an infrared radiation detector 21 with a hemispherical lens 22 are associated with mirror 17. The incoming radiation from space and planet to the right of vertical axis 13 is focused by lens 14 on radiation detector 19 by means of mirror 15. The radiation from space and planet to the left of vertical axis 13 is focused by lens 14 on the radiation detector 21 by means of mirror 17. The electrical outputs produced by detectors 19 and 21 are applied to electronic circuitry 23 which will be described later in this specification. It should be noted that block 23 is only a block diagram representation and is not a true indication of the size or location of the electronic circuitry represented. A mirror actuating arm 24 is attached to mirror 15 by a pivot attachment 25 and a mirror actuating arm 26 is attached to mirror 17 by a pivot attachment 27. The distance of pivot attachment 25 from mirror shaft 16 is the same as the distance from pivot attachment 27 to mirror shaft 18.

Located in the upper portion of cylinder 12 is an electromagnetic device 28 consisting of a coil 29, a coil 30 and a plunger 31. The axes of coils 29 and 30 are located on vertical axis 13. Mirror actuating arms 24 and 26 are attached to plunger 31. A leaf spring 32 is attached to cylinder 12 and plunger 31. Leaf spring 32 tends to maintain plunger 31 in its central position. Voltages are supplied to coils 29 and 30 by a voltage source 33 to create forces which cause plunger 31 to oscillate up and down from its central position. Voltage source 33 can be a multivibrator which alternately applies voltages to coils 29 and 30 to move plunger 31; or it can be an alternating voltage which when applied to these coils will create a force during the positive half of the cycle to pull the plunger up and during the negative half of the cycle to pull the plunger down. Approximately 10–20 cycles per second has been found to be a good oscillating frequency for plunger 31. As plunger 31 moves up and down actuating arms 24 and 26 oscillate mirrors 15 and 17 about their shafts 16 and 18, respectively. This oscillation of mirror 15 serves to scan the field of view of detector 19, and this oscillation of mirror 17 serves to scan the field of view of detector 21. Mirrors 15 and 17 oscillate through arcs of about 10–30 degrees. Attached to one end of mirror 15 is a small plunger 34, made of a ferrous material, which will move into a coil 35 when plunger 31 is in its upper position. When plunger 31 moves out of coil 35, a pulse is generated across coil 35 which is applied to electronic circuitry 23.

Figure 2:
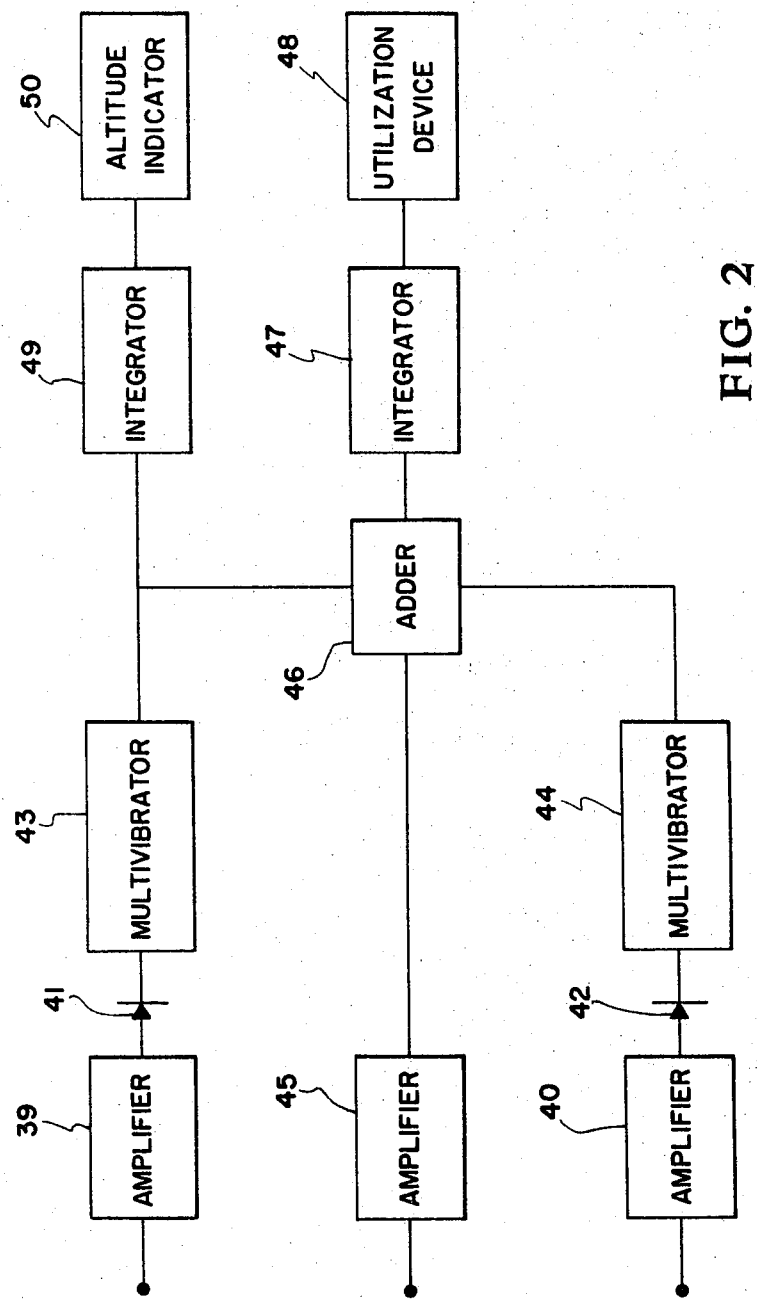
FIG. 2 is a block diagram of the electrical components used in this invention.

The electronic circuitry in block 23 of FIG. 1 will now be described while referring to FIG. 2. The output of detector 19 is applied to an amplifier 39, and the output of detector 21 is applied to an amplifier 40. The outputs produced by amplifiers 39 and 40 will each consist of positive signals and negative signals. The negative signals are the result of mirrors 15 and 17 scanning from planet to space whereas the positive signals are the result of mirrors 15 and 17 scanning from space to planet. The negative signals produced at the outputs of amplifiers 39 and 40 are eliminated by diodes 41 and 42 allowing only the positive signals to be applied to multivibrators 43 and 44. Whenever a positive signal is applied to either multivibrator 43 or multivibrator 44, the multivibrator will start conducting and generate a constant amplitude output voltage. The amplitudes of the voltages generated by multivibrators 43 and 44 are equal, but the voltage generated by multivibrator 44 is negative with respect to the voltage generated by multivibrator 43. The pulse generated across coil 35 is applied to an amplifier 45 where it is amplified and then applied to multivibrators 43 and 44 to cause them to stop conducting. Consequently, the output of multivibrator 43 will be a positive pulse having a constant amplitude and having a duration equal to the time interval between the positive signal produced by detector 19 and the pulse generated across coil 35. And the output of multivibrator 44 will be a negative pulse having a constant amplitude and having a duration equal to the time interval between the positive signal produced by detector 21 and the pulse generated across coil 35. The outputs of multivibrators 43 and 44 are added by an adder 46. The output of adder 46 is a constant amplitude pulse having a duration equal to the difference in the durations of the pulses generated by multivibrators 43 and 44. The pulse produced by adder 46 is negative if the duration of the pulse generated by multivibrator 44 is longer than the duration of the pulse generated by multivibrator 43, and it is positive if the duration of the pulse generated by multivibrator 43 is longer than the duration of the pulse generated by multivibrator 44. Consequently, the duration of the pulse at the output of adder 46 is proportional to the angular deviation of the vertical axis of the attitude sensor from pointing in the direction of the center of the planet, and the polarity of the pulse is indicative of the direction of the angular deviation. The pulse output of adder 46 is integrated by an integrator 47 to produce a voltage amplitude proportional to the duration of the pulse produced by adder 46. The output of integrator 47 is applied to a utilization device 48. Utilization device 48 can be a device for measuring the voltage at the output of integrator 47 to indicate the attitude of the space vehicle, or it can be a torquing system to maintain proper vehicular alignment with respect to the planetary body.

Although this invention is primarily concerned with the attitude of a space vehicle with respect to a planetary body, it can also be used to indicate the altitude of the space vehicle with respect to a planetary body. There are many ways in which this could be done, one of which is to apply the pulse produced by multivibrator 43 to an integrator 49 where the pulse is integrated and applied to an altitude indicator 50. Altitude indicator 50 can be merely a means for measuring the voltage produced at the output of integrator 49. Since changes in voltages produced at the output of integrator 49 will be inversely proportional to changes in altitude of the space vehicle, altitude indicator 50 can be calibrated to indicate altitude. The indication given by altitude indicator 50 will be a true indication of the altitude of the space vehicle when axis 13 is pointing in the direction of the center of the planet. That is, when the output of adder 46 is zero then the indication given by altitude indicator 50 will be correct. When adder 46 is producing an output then the indication given by altitude indicator 50 will be in error. This error could be conveniently compensated for by taking the output of adder 46 dividing it by two and then adding it to the output of multivibrator 43 before it is applied to integrator 49. Then the indication given by altitude indicator 50 would be correct regardless of the attitude of the space vehicle with respect to the planetary body.

Figure 3:
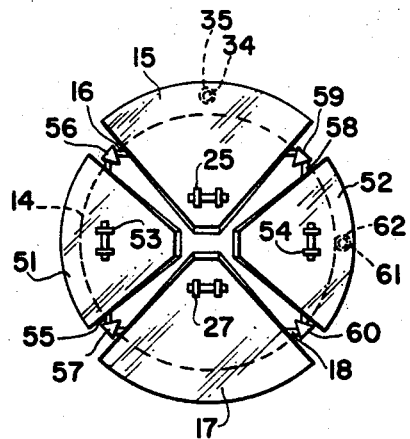
FIG. 3 is a top view of the arrangement of mirrors used by the horizon scanning apparatus in FIG. 1.

The attitude sensor as described in FIG. 1 scans only in one plane; however, this invention consists of a device which will scan in two mutually perpendicular planes. This is best known in FIG. 3 which is a top view of the arrangement of mirrors used in the present invention. In addition to mirrors 15 and 17 as disclosed in FIG. 1, there are two additional mirrors 51 and 52 which scan in a plane perpendicular to the scanning plane of mirrors 15 and 17. Mirror 51 includes a mirror shaft 55 which is rotatably mounted in suitable mounting means 56 and 57. Mirror 52 includes a mirror shaft 58 which is rotatably mounted in suitable mounting means 59 and 60. Mirror shafts 16 and 18 are rotatably mounted in mounting means 56, 57, 59, and 60, perpendicular to, and in the same plane with mirror shafts 55 and 58. Mirrors 51 and 52 also include pivot attachments 53 and 54, respectively. Attached to the undersurface of mirror 52 is a small plunger 61, made of a ferrous material, which will move into and out of a coil 62 to generate a pulse. Plunger 61 and coil 62 are used for the same purpose as plunger 34 and coil 35 disclosed in FIG. 1.

Figure 4:
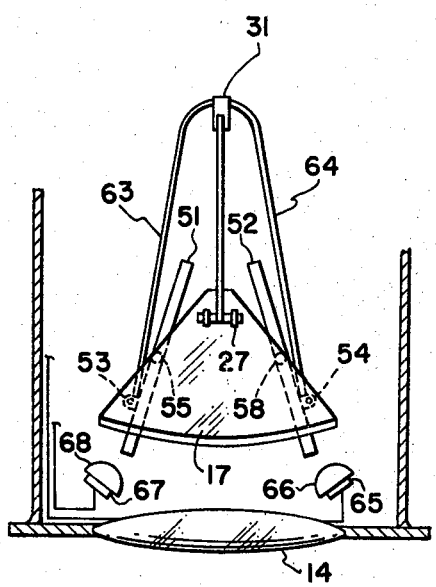
FIG. 4 is a side view of some of the essential components of the horizon scanning apparatus in FIG. 1.

Referring now to FIG. 4 there is shown essential components of the scanning apparatus not yet disclosed. A mirror actuating arm 63 is attached to pivot attachment 53 and plunger 31; and a mirror actuating arm 64 is attached to pivot attachment 54 and plunger 31. A radiation detector 65 with a hemispherical lens 66 are located to pick up the radiation scanned by mirror 52, and a radiation detector 67 with hemispherical lens 68 are located to pick up the radiation scanned by mirror 52. Detectors 65 and 67 and coil 62 are connected to another electronic circuit identical to that disclosed in FIG. 2, except integrator 49 and altitude indicator 50 are omitted.

Figure 5:
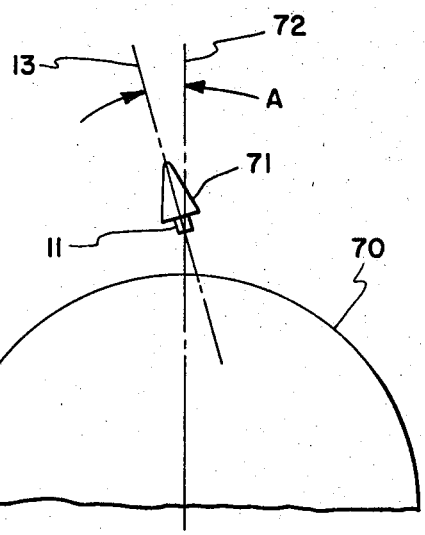
FIGS. 5 and 6 are a pictorial illustration of one application of the attitude sensor of this invention.
Figure 6:
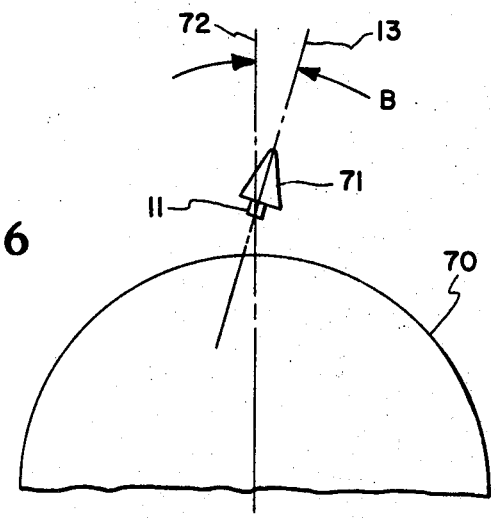

FIGURES 5 and 6 show, for the purpose of description of operation, an assumed attitude of a space vehicle with respect to a planetary body. FIGURE 5 shows a view in a plane, of a planetary body 70 and a space vehicle 71. Attached to the bottom of space vehicle 71 is attitude sensor 11 which constitutes the present invention. As shown, attitude sensor 11 has an attitude with respect to planetary body 70 such that its vertical axis 13 makes an angle A with an imaginary axis 72 drawn from the center of planetary body 70 through attitude sensor 11. FIGURE 6 shows the attitude of attitude sensor 11 with respect to planetary body 70 in a plane perpendicular to the plane of view shown in FIGURE 5. In the plane of FIGURE 6 the attitude of attitude sensor 11 with respect to planetary body 70 is such that axis 13 makes an angle B with axis 72.

The operation of this invention will now be described, for the assumed attitude shown in FIGURES 5 and 6 while referring to FIGURES 1-4. It will be assumed, for purpose of description, that mirrors 15 and 17 scan in the plane shown in FIGURE 5; and that mirrors 51 and 52 scan in the plane shown in FIGURE 6. When plunger 31 is in its upper position mirrors 15 and 17 are in the positions shown in FIGURE 1; and mirrors 51 and 52 are in the opposite positions. That is, when plunger 31 is in its upper position mirrors 15 and 17 are reflecting radiation from space onto detectors 19 and 21, and mirrors 51 and 52 are reflecting radiation from planetary body 70 onto detectors 65 and 67. As plunger 31 moves down, mirrors 15 and 52 are rotated clockwise and mirrors 15 and 51 are rotated counterclockwise.

During the time that plunger 31 moves from its upper position to its lower position, mirrors 15 and 17 scan from space to the planetary body 70. At the instant that mirrors 15 and 17 scan across the dividing lines between space and planetary body 70 positive signals are generated by detectors 19 and 21. For the attitude assumed in FIG. 5 a positive signal will be generated by detector 21 before a positive signal is generated by detector 19. The time interval between these two signals is proportional to angle A. The signal generated by detector 21 is applied to amplifier 40 and the signal generated by detector 19 is applied to amplifier 39. These two signals, after being amplified, are applied through diodes 42 and 41 to multivibrators 44 and 43 to start them conducting. Also during the time that plunger 31 moves from its upper position to its lower position mirrors 51 and 52 scan from planetary body 70 to space. At the instant that mirrors 51 and 52 scan across the dividing lines between planetary body 70 and space negative signals are generated by detectors 65 and 67. These signals are applied to a second circuit identical to that shown in FIGURE 2. These signals are blocked by the two diodes.

During the time that plunger 31 moves from its lower to its upper position mirrors 15 and 52 are rotated counterclockwise and mirrors 17 and 51 are rotated clockwise. During this time plunger 51 moves out of coil 62 causing coil 62 to generate a pulse, and mirrors 51 and 52 scan from space to planetary body 70. At the instant that mirrors 51 and 52 scan across the dividing lines between space and planetary body 70 positive signals are generated, by detectors 65 and 67. For the attitude assumed in FIG. 6, a positive signal is generated by detector 65 before a positive signal is generated by detector 67. The time interval between these two signals is proportional to angle B. These two signals are applied to the two multivibrators to cause them to start conducting. Also during the time that plunger 31 moves from its lower position to its upper position mirrors 15 and 17 scan from planetary body 70 to space. At the instant that mirrors 15 and 17 scan across the dividing lines between planetary body 70 and space, negative signals are generated by detectors 19 and 21. These negative signals are blocked by diodes 41 and 42. When plunger 31 again moves from its upper position, plunger 34 moves out of coil 35 causing a pulse to be generated by coil 35. This pulse is applied through amplifier 45 to multivibrators 43 and 44 to cause them to stop conducting.

The output of multivibrator 43, for the attitude shown in FIGURE 5, is a positive constant amplitude pulse beginning at the instant that mirror 15 scans from space to planetary body 70 across the dividing line between space and planetary body 70, and ending at the instant that coil 35 generates a pulse. The output of multivibrator 44 is a constant amplitude pulse having the same amplitude as the pulse generated by multivibrator 43 but of opposite polarity. The pulse generated by multivibrator 44 begins at the instant mirror 17 scans from space to planetary body 70, across the dividing line between space and planetary body 70, and ends at the instant coil 35 generates a pulse. The output of adder 46 is a constant amplitude negative pulse since multivibrator 44 started conducting before multivibrator 43. Had multivibrator 43 started conducting first the output of adder 46 would be a positive pulse. The output of adder 46 is integrated by integrator 47 to produce a voltage amplitude which is proportional to angle A. The polarity of the output of integrator 47 indicates the direction of angle A.

The advantages of this sensor over prior art sensors are due to a simple, compact, optical system in which a single member oscillating device is used to drive four mirrors, and due to its relatively simple electronic system in which few components are required. Weight, size, and power consumption are minimal; and life expectancy and reliability are relatively high.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. A space vehicle attitude sensor for producing electrical signals representing the angle in a plane made by a reference axis of the sensor and an imaginary line from the center of a planetary body through the sensor comprising: a first mirror mounted to be rotated on a first mirror shaft; a second mirror mounted to be rotated on a second mirror shaft; said first and second mirror shafts being parallel, being in a plane perpendicular to said reference axis and being equidistance from said reference axis; a first mirror actuating arm having one of its ends pivotally attached to said first mirror a predetermined distance from said first mirror shaft; a second mirror actuating arm having one of its ends pivotally attached to said second mirror said predetermined distance from said second mirror shaft; a plunger, located on said reference axis, attached to the other ends of said first and second mirror actuating arms; means for reciprocating said plunger to the extent necessary to rotate said first and second mirrors through an angle of at least 20° thereby scanning space and planet; a first radiation detector located to intercept radiation reflected by said first mirror; a second radiation detector located to intercept radiation reflected by said second mirror; and means for producing electrical signals representing the time intervals between corresponding electrical signals generated by said first and second detectors, said means for producing signals including first and second multivibrator means connected to said first and second detectors to be triggered on by pulses generated by said first and second detectors whereby the electrical signals produced by said means for producing electrical signals represent the angle made by said reference axis and said imaginary line.

2. A space vehicle attitude sensor in accordance with claim 1 wherein said means for producing electrical signals includes means for generating a pulse at the same point in each cycle of said plunger, and means for applying this pulse to said first and second multivibrators to trigger them off.

3. A combination space vehicle altitude and attitude measuring device comprising: a first mirror mounted to be rotated on a first mirror shaft; a second mirror mounted to rotate on a second mirror shaft; said first and second mirror shafts being parallel, being in a plane perpendicular to a reference axis of the space vehicle, and being equidistance from said reference axis; a first mirror arm having one of its ends pivotally attached to said mirror a predetermined distance from said first mirror shaft; a second mirror actuating arm having one of its ends pivotally attached to said second mirror said predetermined distance from said second mirror shaft; a plunger, located on said reference axis, attached to the other ends of said first and second mirror actuating arms; means for reciprocating said plunger to the extent necessary to rotate said first and second mirrors through an angle of at least 20° scanning space and planet; a first radiation detector located to intercept radiation reflected by said first mirror; a second radiation detector located to intercept radiation reflected by said second mirrors; means for producing electrical signals representing time intervals between corresponding electrical signals generated by said first and second detectors; means utilizing said electrical signals to sense and correct the attitude of the vehicle; means for producing a pulse at the same instant of every cycle made by said plunger; means for combining the outputs of said last mentioned means and the said first and second detectors to produce a voltage proportional to the altitude of said space vehicle; and means for reading said proportional voltage to indicate altitude of the vehicle.

4. A space vehicle attitude sensor for producing electrical signals representing the angle in a plane made by a reference axis of the sensor and an imaginary line from the center of a planetary body through the sensor as in claim 1 comprising: a third mirror mounted to be rotated on a third mirror shaft; a fourth mirror mounted to be rotated on a fourth mirror shaft; said mirrors forming pairs; said pairs being parallel and perpendicular to each other; and said third and fourth mirrors being connected by actuating arms to said plunger.

References Cited
UNITED STATES PATENTS

| 3,020,407 | 2/1962  | Merlen        | 250—83.3 |
|-----------|---------|---------------|----------|
| 3,107,300 | 10/1963 | Stanley et al.| 250—83.3 |

JEWELL H. PEDERSEN, *Primary Examiner.*

B. J. LACOMIS, *Assistant Examiner.*